Jerry L. McFarland, INVENTOR.

BY Robert H. Himes

ATTORNEY.

Jerry L. McFarland,
*INVENTOR.*

Jerry L. McFarland,
INVENTOR.

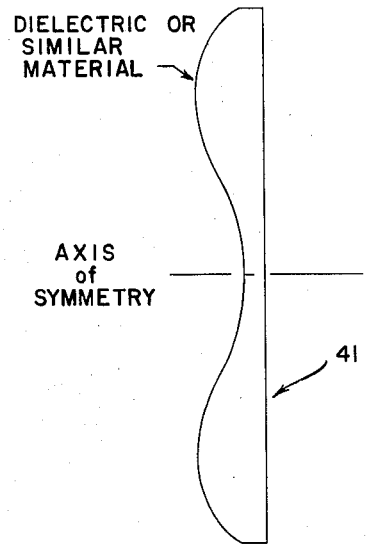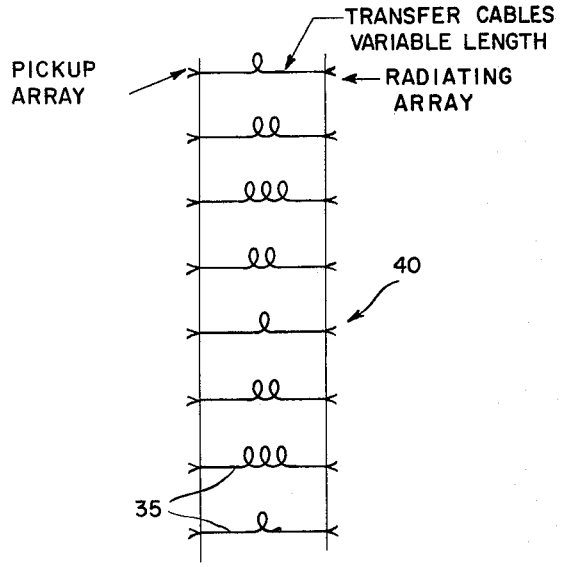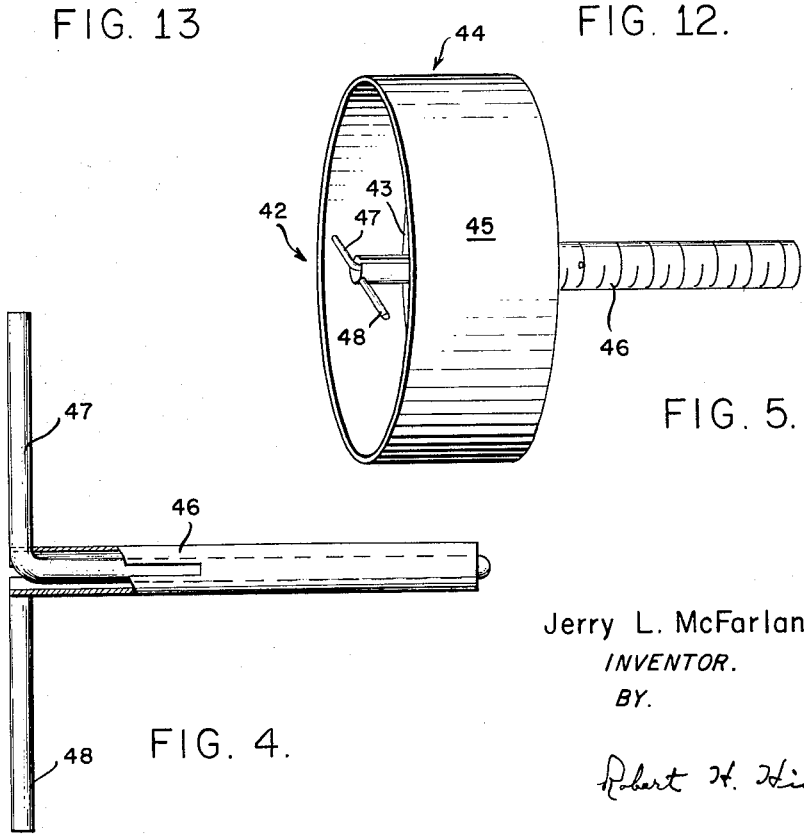

Jerry L. McFarland,
INVENTOR.

ATTORNEY.

Jerry L. McFarland,
INVENTOR.

BY.

Robert H. Himes
ATTORNEY.

United States Patent Office 3,245,081
Patented Apr. 5, 1966

3,245,081
MULTIPLE FEED WIDE ANGLE ANTENNA UTILIZING BICONCAVE SPHERICAL DELAY LENS
Jerry L. McFarland, Fullerton, Calif., assignor to Hughes Aircraft Company, Culver City, Calif., a corporation of Delaware
Filed Feb. 8, 1963, Ser. No. 257,134
8 Claims. (Cl. 343—754)

This invention relates to microwave antennas and more particularly to a wide angle microwave lens capable of simultaneously and independently radiating or receiving beams of electromagnetic energy in determinable directions in space.

Typical present day devices employed to radiate or receive a multiplicity of "pencil" beams of electromagnetic or similar energy in more than one direction in space are the parabolic reflector with multiple feeds, the Cassegrain reflector with multiple feeds, the simple hemispherical reflector with multiple feeds, the Schmidt reflector with multiple feeds, and the Luneburg lens with multiple feeds. These present day devices are generally not capable of simultaneously providing a near perfect phase distribution over the antenna aperture for all angles of scan for all beam positions, generating beams in determinable positions that are independent of frequency, generating a wavefront wherein each portion thereof arrives at a corresponding focal point at substantially the same time, and generating beams having principal rays which always pass through the center of a common aperture, i.e., possess an aperture distribution that does not scan the aperture as the beam scans in space. In addition, present day devices either incorporate a lens which requires a non-uniform dielectric, possesses multiple feeds which present aperture blockage, or require an invariant polarization for each feed.

It is, therefore, an object of the present invention to provide an improved wide angle microwave lens.

Another object of the present invention is to provide a microwave lens capable of simultaneously and independently radiating or receiving beams of electromagnetic energy in determinable directions in space having near perfect phase distribution over the aperture thereof for all angles of scan.

Still another object of the present invention is to provide a wide angle microwave lens which does not require a non-uniform dielectric or have multiple feeds that present aperture blockage.

A further object of the invention is to provide a multiple feed microwave lens wherein each feed thereof is capable of being operated at a determinable polarization.

In accordance with a preferred embodiment of the present invention, corresponding portions of first and second conductive substantially spherical concentric shells having a ratio of radii of approximataely 1:2, respectively, are each provided with numerous antenna elements within the volume therebetween. A third conductive substantially spherical shell similar in configuration to said second shell is provided with antenna elements disposed over the inner surface thereof in respective positions that correspond to the positions of the antenna elements mounted to the second shell. Lastly, corresponding antenna elements of the second and third shells are connected together through the outer surfaces thereof with equal length transmission lines. That is, the electrical length of the transmission line between any pair of corresponding antenna elements is always the same.

In operation, a selected antenna element on the first shell is either coupled to or energized, depending on whether a signal is to be received or transmitted. In the event the signal is to be transmitted, a spherical wave emanates from the particular antenna element energized. This spherical wave induces voltages in the antenna elements mounted on the second shell, which voltages are coupled to and energize corresponding antenna elements on the third shell thereby generating a wavefront in a direction that is unique with the position of the selected antenna element on the first shell. Receiving electromagnetic waves from this unique direction, on the other hand, is accomplished by coupling to the aforementioned antenna element on the first shell.

An alternative to the above embodiment of the invention is to employ a first shell with no antenna elements mounted thereon and to couple to or energize selected antenna elements on the second shell while at the same time disconnecting the corresponding antenna element on the third shell. In this event, the ratio of the radii of the first and second shells is approximately 2:3, respectively.

The above-mentioned and other features and objects of this invention and the manner of obtaining them will become more apparent by reference to the following description taken in conjunction with the accompanying drawings, wherein:

FIG. 4 illustrates a partial cross-sectional view of a coaxial dipole radiator of the beam forming lenses of FIGS. 2 and 3;

FIG. 5 illustrates a perspective view of the coaxial dipole radiator of FIG. 4 in a cylindrical cavity;

Figure 9:
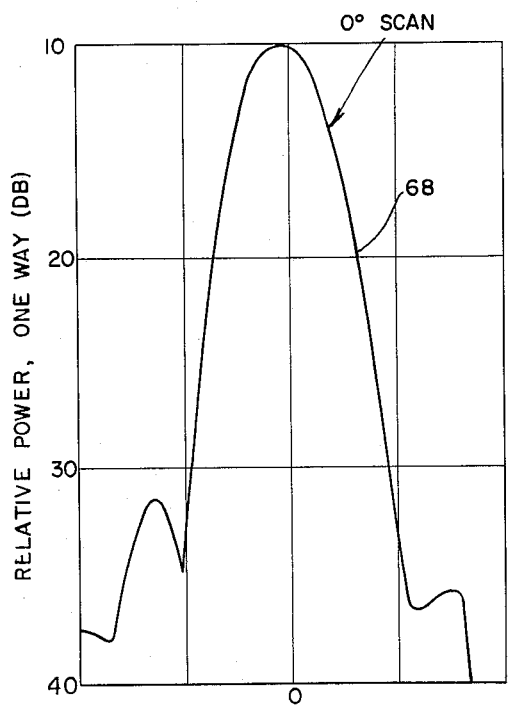
Figure 11:
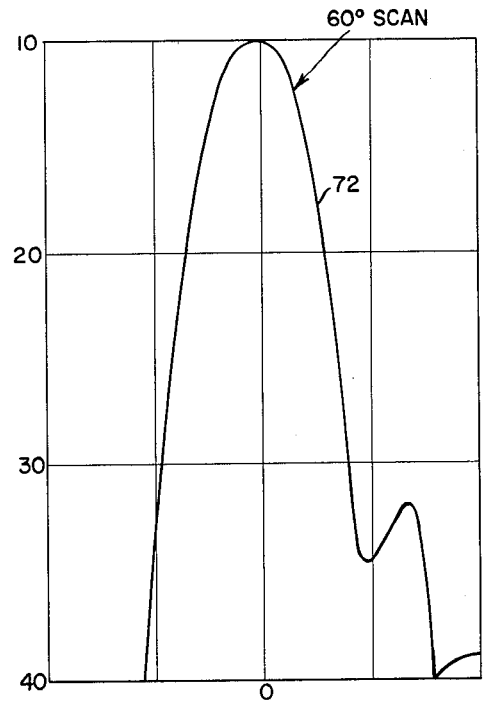
Figure 10:
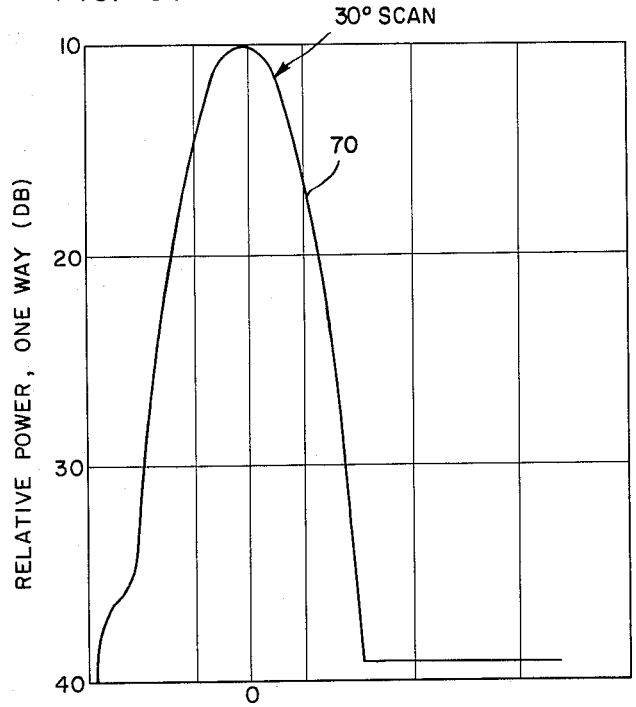

FIGS. 9, 10 and 11 show curves illustrating relative power in decibels normal to the plane of scan vs. angles of scan for 0°, 30° and 60°, respectively, relative to the broadside of the antenna.

Figure 2:
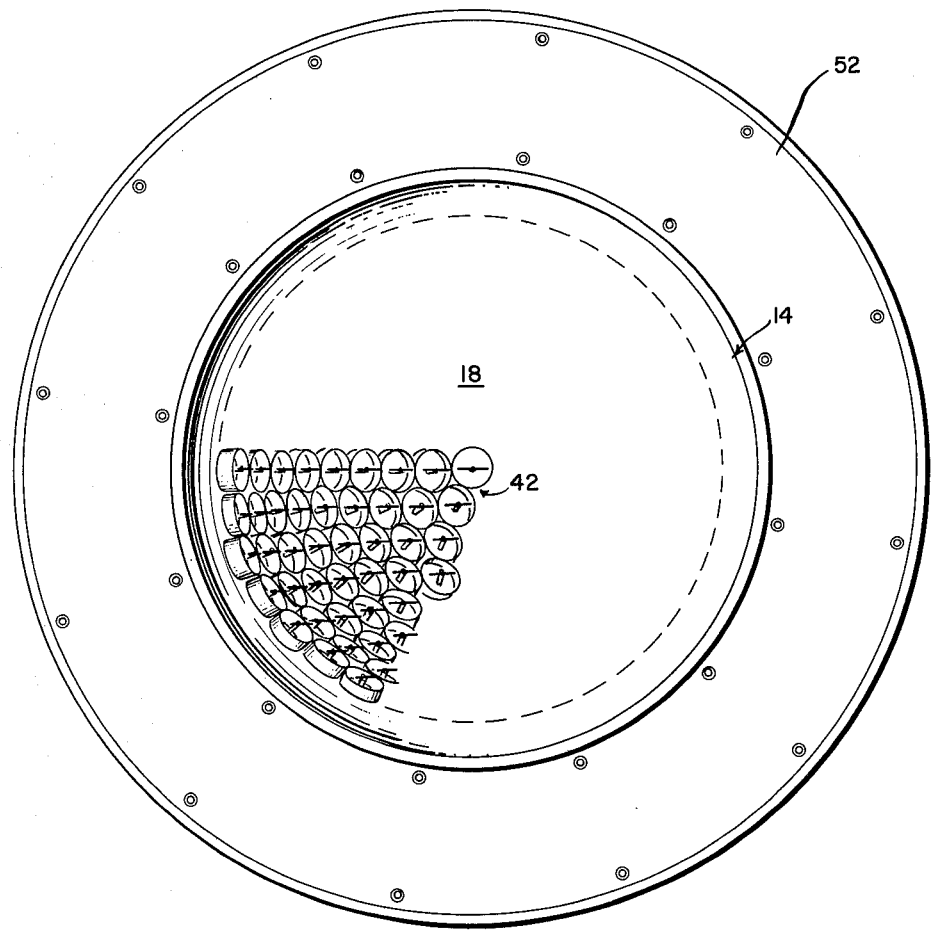
FIG. 2 is a front view in perspective of the beam forming lens of the antenna with only a segment of the radiating elements illustrated.

FIG. 12 illustrates a pickup and radiating correctional array with variable length interconnecting cables for the beam forming lens of FIG. 2; and FIG. 13 illustrates a cross-sectional diagram of a dielectric correctional lens for the beam forming lens of FIG. 2.

Figure 1:
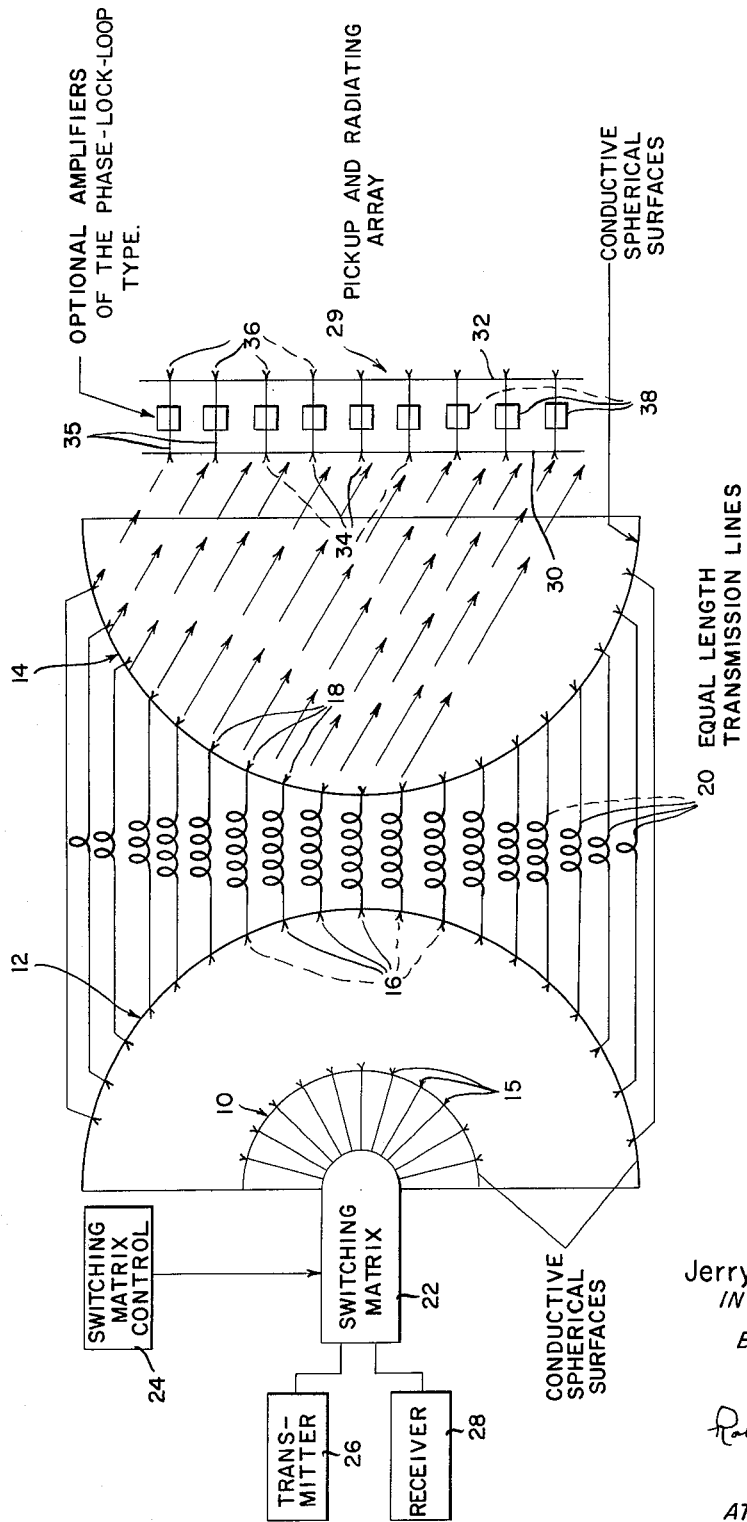
FIG. 1 is a cross-sectional schematic view of a preferred embodiment of the invention.

Referring now to FIG. 1 of the drawings, there is shown a schematic diagram of a preferred embodiment of the apparatus of the present invention wherein only a cross-section of the antenna portion is shown to more clearly illustrate the invention. In particular, the device of the present invention comprises conductive shells 10, 12 and 14 which constitute corresponding portions of spheres where shells 12 and 14 subtended substantially the same solid angle, and where shell 10 subtends a solid angle equal to or greater than the solid angle subtended by shells 12 and 14. In a typical case, the shells 10, 12 may, for example, constitute concentric hemispheres with the radius, $R_1$, of shell 10 being approximately equal to one-half the radius, $R_2$, of shell 12. The radius, $R_3$, of the shell 14, on the other hand, is determined by the size of the aperture desired. In the assembly of the apparatus of the invention, shells 10, 12 are fixed concentrically about a common center in a manner to subtend the aforementioned relative solid angles and a plurality of radiating elements 15 are disposed over the outer surface of the spherical shell 10, i.e., the surface facing the inner surface of shell 12. In addition, numerous radiating elements 16 of a polarity consistent with that of the radiating elements 15 are disposed uniformly over the entire inner surface of shell 12 and radiating elements 18 are disposed over the entire inner surface of conductive shell 14 in positions corresponding to the positions of the radiating elements 16 in conductive shell 12. Each radiating element 16 in the conductive shell 12 is connected to the corresponding radiating element 18 in the conductive shell 14 over an equal length transmission line 20. The radiating elements 15, 16 and 18 may constitute any conventional type antenna element with any single or dual orthogonal polarization. In the event dual orthogonal polarization is employed, a transmission line is required for each polarization component, i.e., two transmission lines are required from each of the radiating elements 16 to the corresponding radiating element 18 on shell 14 to provide coupling for the two components.

A switching matrix 22 controlled by a switching matrix control 24 selectively connects each of the radiating elements 15 on the conductive shell 10 to either a transmitter 26 or a receiver 28. Switching matrix 22 may constitute any conventional type electronic, solid state or electromechanical switching matrix and the switching matrix control 24 may constitute a manual system or may be operated in connection with a digital computer counting device or other system. In either receiving or transmitting, it is not essential that only a single radiating element 15 be coupled to or be energized exclusively. That is, each of the radiating elements 15 may have its individual receiver or transmitter and may be operated concurrently with one or more of the remaining radiating elements 15.

Radiation and reception of electromagnetic energy from the disclosed microwave lens may take place directly from the radiation elements 18 of the conductive surface 14. When this is done, however, there exists a "path length error" which depends upon the direction in space relative to the axis of rotation of the shell 14 that the beam is being formed. In addition, it may be desirable to partially remove the path length error and further amplify the beam at this stage. In this event, a pickup-radiating array 29 comprising conductive parallel coextensive sheets 30, 32 is disposed normal to the axis of symmetry of the shell 14. Sheet 30 is substantially located at the diameter of hemisphere 14. Radiating elements 34 are disposed uniformly over the conductive sheet 30 and are connected over transmission lines 35 to corresponding radiating elements 36 disposed over the conductive sheet 32. The amplitude distribution of the components of the electromagnetic field radiated from the radiating elements 18 on conductive shell 14 is even and stationary for all scan angles whereby amplifiers 38 of, for example, the phase-lock-loop type may be connected in series with each transmission line 35 between corresponding radiating elements 34, 36. In the event it is desired to improve the "planeness" of the phase front of the beam formed at the aperture of conductive shell 14, the length of the transmission lines 35 intermediate the corresponding radiating elements 34, 36 are illustrated in the pickup-radiating array 40, shown schematically in FIG. 12. In this event, the length of the transmission lines 35 intermediate the outer periphery of the conductive sheets 30, 32 and the central portions thereof are made progressively longer and then shorter in proceeding from the outer periphery along any radius towards the center of the array. Alternatively, if it is desired to improve the planeness of the phase front but not to amplify the beam thus formed, a dielectric lens 41, shown in cross section in FIG. 13, may be used in lieu of the pickup array 29. Generally, the configuration of dielectric lens 41 will be formed by a surface of revolution about the axis of symmetry of the shell 14, as shown in FIG. 12 of the drawings, with the thickest portion of the lens 41 being intermediate the outer periphery and the center portion thereof.

Figure 3:
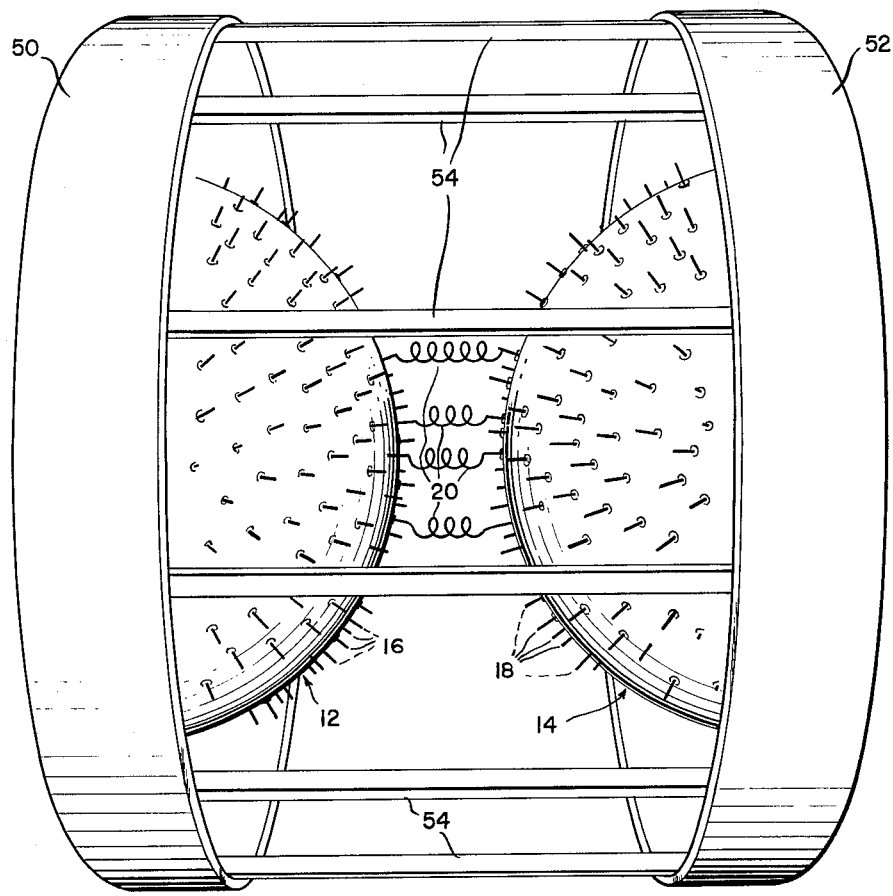
FIG. 3 is a side view in perspective of partially interconnected beam forming lenses.

Although any type of radiating element may be employed for the radiating elements 15, 16, 18, a dipole cavity 42, shown in FIGS. 4 and 5 has been found to operate satisfactorily. In particular, the element 42 includes a disc portion 43 with a rim portion 44 disposed about the outer periphery thereof thereby providing a flat, cylindrically shaped cavity 45. A coaxial line segment 46 is disposed through the center portion of the disc 43 with both the inner and outer portions thereof extending therethrough to a height approximately equal to the width of the rim 44. The outer conductor of the portion of coaxial line segment 46 extending through the disc 44 is slit along diametrically opposite sides thereof. Dipole elements 47, 48 are mounted transverse to the plane of the slit at the extremity of the coaxial line segment 46 within the cavity 45 with the dipole element 47 extending from the center conductor thereof through the central portion of one of the halves of the outer conductor for a distance short of the rim 44. The remaining dipole element 48 extends in a diametrically opposite direction from the remaining half of the outer conductor of the coaxial line segment 46. Referring to FIG. 2, there is illustrated a typical manner in which the dipole cavity elements 42 may be employed as the radiating elements 18 within the spherical shell 14. The hemispherical shell in this case is supported by a flange 52. Further, FIG. 3 shows hemispherical shells 12, 14 with radiating elements 16, 18 disposed therethrough and connected together with equal length transmission lines 20. In order to minimize confusion in the drawing, only four connections by equal length transmission lines are illustrated. The hemispherical shells 12, 14 are supported back-to-back about the outer peripheries thereof with flanges 50, 52, respectively, which flanges 50, 52 are maintained in fixed relation relative to each other by means of connecting braces 54 which extend between the flanges 50, 52 at uniformly spaced intervals about the outer peripheries thereof.

In the operation of the apparatus of the present invention, a selected radiating element 15 is energized by the transmitter 26 as determined by the switching matrix control 24 and the switching matrix 22. A substantially spherical wavefront emanates from the energized radiating element 15 to induce signals in the radiating elements 16 having phase differences as determined by the time sequence in which the wavefront emanating from the energized radiating element 15 passed over the radiating elements 16. These signals induced in the radiating elements 16 on the inner surface of the shell 12 are transmitted by the equal length transmission lines 20 to the corresponding radiating elements 18 on the inner surface of shell 14. The resulting wavefront radiated from the array of radiating elements 18 is approximately a plane wave normal to a direction determined by the energized radiating element 15 on the shell 10. In the event it is desired to make corrections for the path length error, the wavefront radiated from elements 18 induces signals in the radiating elements 34 which are, in turn, coupled through the transmission lines 35 and amplified by the phase-lock-loop amplifiers 38 and the corrected wavefront radiated from the radiating elements 36.

Figure 8:
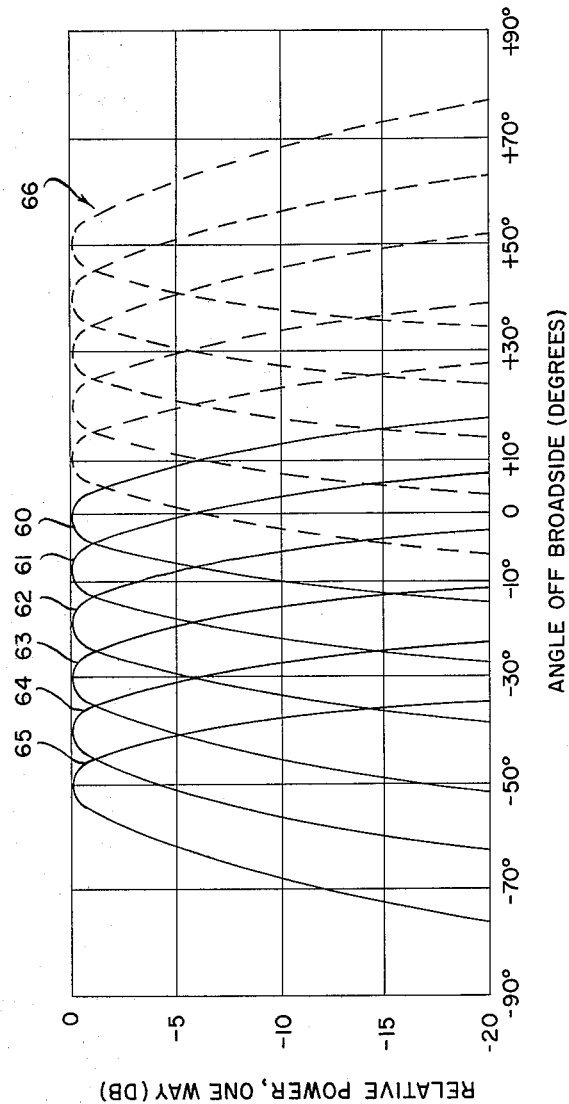
FIG. 8 shows curves illustrating relative power in decibels vs. angle relative to broad side of the antenna taken in the plane of scan.

Referring to FIG. 8, there are illustrated relative power curves taken in the plane of scan for the apparatus constructed in accordance with the invention and described in connection with FIGS. 2, 3 and 4. In particular, curves 60, 61, 62, 63, 64, 65 show the relative power pattern in decibels where the plane of cut is taken in the plane of scan for the angles 0°, −8°, −18°, −30°, −40° and −50° off broadside, respectively. Each of the relative power pattern curves 60–65 correspond to a unique radiating element 15 on the shell 10. Similar curves shown by the dashed lines 66 may be derived for the opposite direction in the plane of scan. Referring to FIG. 9, there is shown a relative power pattern 68 where the plane of cut is taken normal to the plane of scan through the maximum intensity of the beam for a beam that is 0° from broadside in the plane of scan. As before, the relative power pattern 68 is representative of relative power in decibels for the apparatus described in connection with FIGS. 2, 3 and 4 of the drawings. Similarly, FIGS. 10 and 11 show relative power patterns 70, 72, respectively, where the plane of cut is taken normal to the plane of scan when the maximum intensity of the beam from broadside in the plane of scan is 30° and 60°, respectively.

Figure 6:
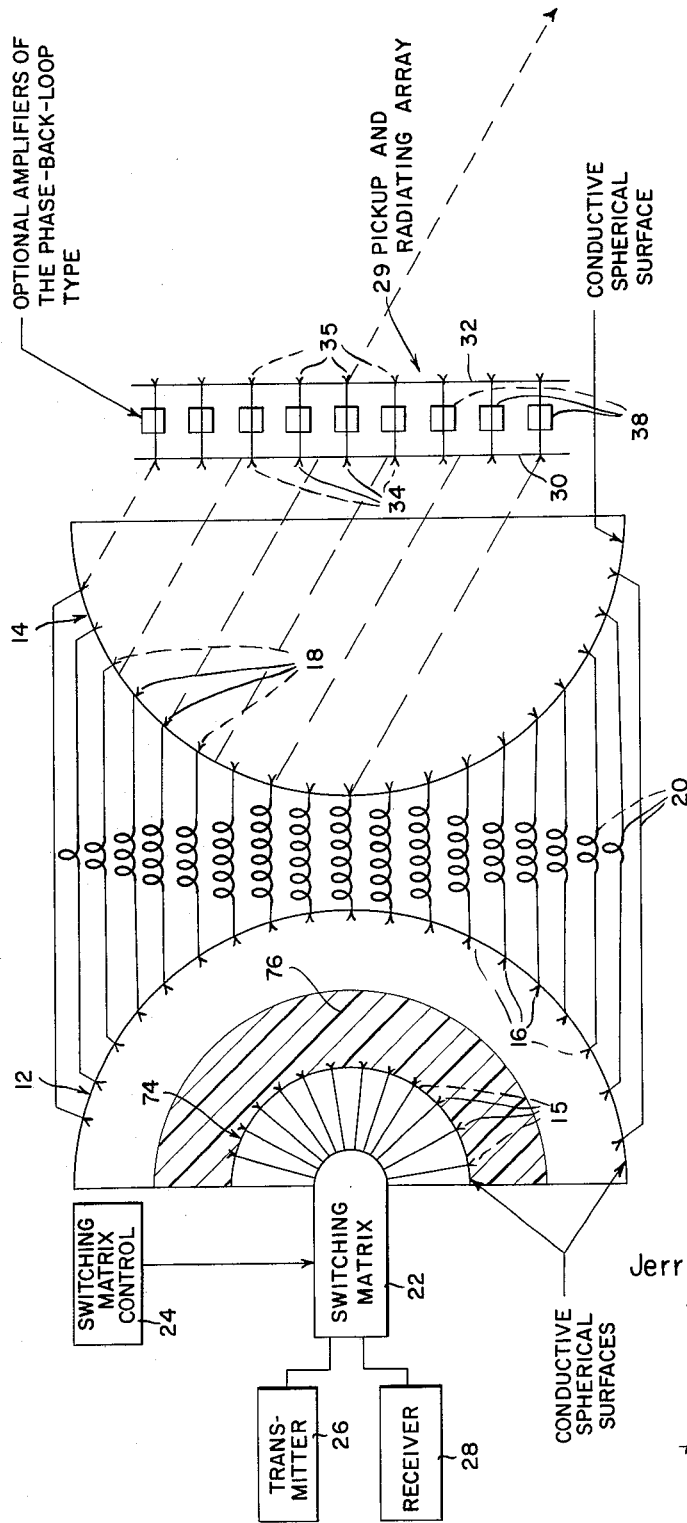
FIG. 6 shows the embodiment of the invention illustrated in FIG. 1 with dielectric material disposed intermediate the beam forming lens and feed surface.

There may be instances where it is inconvenient or undesirable to have the radius, $R_1$, of the shell 10 substantially equal to one-half the radius, $R_2$, of the shell 12. Referring to FIG. 6, wherein like reference numerals designate like elements, there is shown an apparatus similar to that described in connection with FIG. 1 with the exception that a shell 74 of radius, $R_4$, is employed in lieu of the shell 10. The radius, $R_4$, is specified as being less than one-half the radius, $R_2$, of shell 12 and a uniformly thick layer 76 of dielectric material is disposed intermediate the shells 74, 12. The actual thickness of the layer 76 is in part determined by the relative dielectric constant thereof and the amount by which the radius, $R_4$, is less than one-half the radius, $R_2$. It is also, in part, determined by the size of the radiating aperture, in wavelengths, and the degree by which path length error is tolerable. It is to be noted that it is not necessary that the layer 74 of dielectric material be disposed immediately adjacent to either the shell 74 or the shell 12, but may for convenience of fabrication be disposed immediately adjacent to either shell 74 or shell 12.

Figure 7:
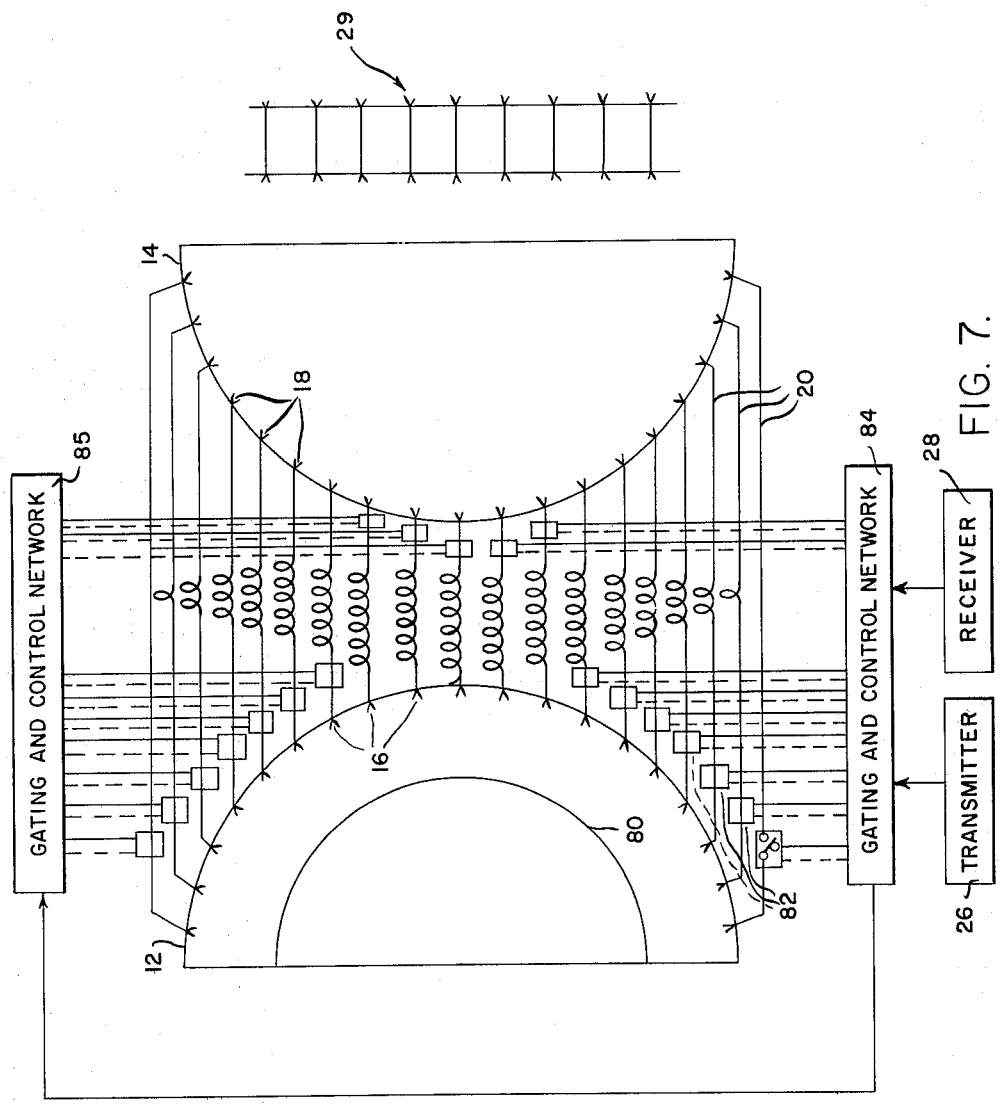
FIG. 7 is a cross-sectional schematic view of an alternate embodiment of the invention.

Referring now to FIG. 7, there is shown an alternate embodiment of the present invention wherein like reference numerals designate like elements. In particular, a conductive shell 80 of radius, $R_5$, is disposed concentric with the shell 12 in lieu of the conductive shell 10 and radiating elements 15. In this event, the shell 80 constitutes a portion of a sphere and subtends no less than the same solid angle that is subtended by the shell 12. Further, the radius, $R_5$, of shell 80 is made substantially equal to two-thirds the radius, $R_2$, of shell 12. As before, if a layer of dielectric material is dispoesd intermediate the shell 80 and the shell 12, the radius, $R_5$, of shell 80 may be made correspondingly smaller than two-thirds of radius, $R_2$, of shell 12.

In the present case, to effect the generation of an electromagnetic wave in a selected direction, it is necessary to energize a particular one of the radiating elements 16 disposed on the inner surface of the shell 12 and at the same time disconnect it from its corresponding radiating element 18 disposed on the inner surface of the shell 14. To accomplish this, switches 82 are inserted in series with each transmission line 20 connecting the radiating elements 16 to the corresponding radiating elements 18. These switches 82 either connect a particular radiating element 16 directly to its corresponding radiating element 18 in shell 14 or connect the radiating element 16 to the input of gating and control networks 84, 85. The gating and control networks 84, 85 control the state of the switches 82 by mechanical linkages or other conventional means to either energize selected radiating elements 16 with energy provided by the transmitter 26 or alternatively to couple radiating elements 16 to the receiver 28. In operation, the gating and control networks 84, 85 connect transmitter 26 to a selected one of the radiating elements 16 by means of an appropriate switch 82, the remaining radiating elements 16 being connected to the corresponding radiating elements 18 in hemisphere 14 through the remaining switches 82. The radiating element 16 thus energized couples either directly or through energy reflected off of shell 80 to the remaining radiating elements 16 thereby to energize these elements 16 in substantially the same phase relationships as before whereby an electromagnetic wave is propagated from the elements 18 in a predetermined direction. In the receiving mode, operation is bi-directional. The transmitter 26 and receiver 28 are switched in a conventional manner to transmit and receive on the same channel. As before, it is within the scope of the present invention to employ more than one receiving channel to simultaneously receive energy along several discrete beams or paths or, alternatively, to simultaneously energize more than one radiating element 16 to transmit corresponding wavefronts in more than one discrete direction. Lastly, the pickup-radiating array 29 may be disposed in front of the aperture of shell 14 in the same manner as in the device described in connection with FIGS. 1 and 6, if desired.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. A microwave lens comprising: (a) first and second spherical conductive shells each having a uniform radius of curvature as measured from respective centers of curvature and subtending substantially equal solid angles emanating from said respective centers of curvature thereof; (b) first and second sets of radiating elements disposed in corresponding positions over the inner surfaces of said first and second shells, respectively; (c) equal length transmission lines connecting each radiating element of said first set to the radiating element of said second set disposed in a corresponding position on said second shell; and (d) means for directing a spherical electromagnetic wavefront towards said first set of radiating elements at any selected one of several determinable angles of incidence, said spherical wavefront at the time of incidence on said first shell having a radius of curvature less than the radius thereof thereby to produce a substantially collimated beam having a unique direction from the aperture of said second shell.

2. The microwave lens as defined in claim 1 wherein each of said radiating elements of said first and second sets thereof is of a single polarization.

3. The microwave lens as defined in claim 1 wherein each of said radiating elements of said first and second sets thereof has dual orthogonal polarization and said respective equal length transmission lines include two bilateral channels.

4. A microwave lens comprising: (a) a first spherical conductive shell having a predetermined radius of curvature as measured from a first center of curvature and a second spherical shell having a uniform radius of curvature as measured from a second center of curvature, said first and second spherical shells subtending substantially equal solid angles emanating from said respective first and second centers of curvature; (b) first and second sets of radiating elements disposed in corresponding positions over the inner surfaces of said first and second shells, respectively; (c) equal length transmission lines connecting each radiating element of said first set to the radiating element of said second set disposed in a corresponding position on said second shell; (d) a third spherical conductive shell having a constant radius of curvature as measured from said first center of curvature equal to one-half said predetermined radius of curvature and disposed concentrically within said first spherical shell and subtending a solid angle of equal to said equal solid angles; and (e) means including a plurality of radiating elements disposed in predetermined positions on the outer surface of said third spherical shell for providing a substantially collimated beam emanating from the aperture of said second shell having a unique direction determined by said predetermined position of said plurality of radiating elements on said third shell.

5. The microwave lens as defined in claim 4 wherein said respective radiating elements of said first and second sets thereof are of a single polarization and said plurality of radiating elements disposed on said third shell is of a single polarization and oriented to couple to said radiating elements of said first set thereof.

6. The microwave lens as defined in claim 4 wherein said radiating elements of said first and second sets thereof have dual orthogonal polarization and said respective equal length transmission lines connecting each radiating element of said first set to the corresponding radiating element of said second set includes first and second channels for the respective components of the signals coupled therebetween.

7. A microwave lens antenna comprising: (a) a first spherical conductive shell having a predetermined radius of curvature as measured from a first center of curvature and a second spherical conductive shell having a uniform radius of curvature as measured from a second center of curvature, said first and second shells subtending substantially equal solid angles emanating from said first and second respective centers of curvature; (b) first and second sets of radiating elements disposed in corresponding positions over the inner surfaces of said first and second spherical shells, respectively; (c) equal length transmission lines connecting each radiating element of said first set to the radiating element of said second set disposed in a corresponding position on said second spherical shell; (d) a third spherical conductive shell having a radius of curvature as measured from said first center of curvature less than one-half said predetermined radius of curvature and disposed concentrically within said first spherical shell and subtending a solid angle equal to and coextensive with the solid angle subtended by said first shell; (e) a plurality of radiating elements disposed in selected positions on the outer surface of said third spherical shell; (f) means including a uniformly thick layer of dielectric material of constant radius of curvature disposed concentrically between said first and third conductive shells for compensating for the amount by which the radius of curvature of said third conductive shell is less than one-half said predetermined radius of curvature; and (g) means coupled to said plurality of radiating elements for producing substantially collimated beams emanating from the aperture of said second shell and having unique directions determined by said respective selected positions of said plurality of radiating elements on said third shell.

8. A microwave lens antenna comprising: (a) a first spherical conductive shell having a predetermined radius of curvature as measured from a first center of curvature and a second spherical conductive shell having a uniform radius of curvature as measured from a second center of curvature, said first and second shells subtending substantially equal solid angles emanating from said first and second respective centers of curvature; (b) first and second sets of radiating elements disposed in corresponding positions over the inner surfaces of said first and second shells, respectively; (c) equal length transmission lines connecting each radiating element of said first set to the radiating element of said second set disposed in a corresponding position on said second shell; (d) a third spherical conductive shell having a radius of curvature as measured from said first center of curvature equal to two-thirds said predetermined radius of curvature and disposed concentrically within said first shell; and (e) means interconnected in no less than one of said equal length transmission lines for providing an input connected to a selected radiating element of said first set and for disconnecting said selected radiating element from the radiating element corresponding thereto in said second set thereby to produce a substantially collimated beam emanating from the aperture of said second shell and having a unique direction determined by the position of said selected radiating element of said first set on said first shell.

References Cited by the Examiner
UNITED STATES PATENTS

| 1,738,522 | 12/1929 | Campbell | 343—100 |
| 2,367,764 | 1/1945 | Ferris | 343—753 |
| 2,566,703 | 9/1951 | Iams | 343—753 |
| 2,986,734 | 5/1961 | Jones et al. | 343—754 |
| 3,045,237 | 7/1962 | Marston | 343—754 |

FOREIGN PATENTS

| 860,826 | 2/1961 | England. |

HERMAN KARL SAALBACH, *Primary Examiner.*